United States Patent
Takesue et al.

(10) Patent No.: US 7,303,490 B2
(45) Date of Patent: Dec. 4, 2007

(54) GOLF BALL AND MAKING METHOD

(75) Inventors: Rinya Takesue, Chichibu (JP); Hiroyuki Nagasawa, Chichibu (JP); Eiji Takehana, Chichibu (JP); Toshihiko Manami, Chichibu (JP)

(73) Assignee: Bridgestone Sports Co., Ltd., Tokyo (JP)

( * ) Notice: Subject to any disclaimer, the term of this patent is extended or adjusted under 35 U.S.C. 154(b) by 127 days.

(21) Appl. No.: 10/942,138

(22) Filed: Sep. 16, 2004

(65) Prior Publication Data

US 2005/0059509 A1   Mar. 17, 2005

(30) Foreign Application Priority Data

Sep. 17, 2003   (JP) .............................. 2003-324433

(51) Int. Cl.
*A63B 37/06*   (2006.01)

(52) U.S. Cl. ....................................... 473/378

(58) Field of Classification Search ................ 473/378, 473/351

See application file for complete search history.

(56) References Cited

U.S. PATENT DOCUMENTS

2005/0020385 A1* 1/2005 Onoda et al. ................ 473/371
2005/0228140 A1* 10/2005 Rajagopalan et al. ....... 525/221

FOREIGN PATENT DOCUMENTS

JP          2002-253703 A       9/2002

* cited by examiner

*Primary Examiner*—Raeann Trimiew
(74) *Attorney, Agent, or Firm*—Sughrue Mion Pllc.

(57) ABSTRACT

In a golf ball comprising a core and a cover, at least one layer of the cover is formed of a cover stock composition in which fullerene and/or carbon nanotubes are uniformly dispersed in a thermoplastic resin. The golf ball is prepared by uniformly dispersing fullerene and/or carbon nanotubes in a thermoplastic resin to provide a cover stock composition and forming at least one layer of the cover from the cover stock composition.

5 Claims, No Drawings

US 7,303,490 B2

GOLF BALL AND MAKING METHOD

CROSS-REFERENCE TO RELATED APPLICATIONS

This non-provisional application claims priority under 35 U.S.C. Section 119(a) on Patent Application No. 2003-324433 filed in Japan on Sep. 17, 2003, the entire contents of which are incorporated herein by reference.

TECHNICAL FIELD

This invention relates to a golf ball having improved rebound, durability and feel when hit, and a method for preparing the same.

BACKGROUND ART

In the prior art, a variety of studies were made to tailor the formulation of golf ball-forming material for the purpose of endowing golf balls with better rebound. Golf balls are required to have not only good rebound, but also a diversity of properties including a soft feel when hit and durability. It is a key to find a higher order compromise among these properties.

For example, JP-A 2002-253703 discloses a technique of incorporating a fullerene or derivative thereof in a rubber material (typically polybutadiene rubber containing at least 40% of cis-1,4-bond) of which a golf ball core is made, thus providing a golf ball having excellent rebound performance and a pleasant feel when hit. Because of its special molecular configuration, the fullerene or derivative thereof is often difficult to uniformly and finely disperse in a medium as compared with commonly used additives. If an additive is not uniformly and finely dispersed in a golf ball-forming material, the golf ball made therefrom may be adversely affected, typically detracting from durability to consecutive shots.

There is a need for an effective means of finely dispersing a fullerene or derivative thereof in a golf ball-forming material.

SUMMARY OF THE INVENTION

An object of the present invention is to provide a golf ball prepared from a golf ball-forming material having fullerene or carbon nanotubes uniformly dispersed therein so that the ball has a better balance of rebound, durability and feel on impact. Another object is to provide a method of preparing the same.

It has been discovered that using a special compounding method, fullerene or carbon nanotubes can be uniformly dispersed in a thermoplastic resin to form a golf ball-forming material; and that using a golf ball-forming composition having fullerene or carbon nanotubes uniformly dispersed therein to form a golf ball cover, a golf ball having a good balance of rebound, durability and feel on impact can be produced.

In one aspect, the invention provides a golf ball comprising a core and a cover of one or more layers enclosing the core, wherein at least one layer of the cover is formed of a cover stock composition comprising (A) a thermoplastic resin and (B) fullerene and/or carbon nanotubes uniformly dispersed therein.

In another aspect, the invention provides a method of preparing a golf ball comprising a core and a cover of one or more layers enclosing the core, the method comprising the step of forming at least one layer of the cover from a cover stock composition comprising (A) a thermoplastic resin and (B) fullerene and/or carbon nanotubes. The forming step includes the step of uniformly dispersing component (B) in component (A).

In a preferred embodiment, the dispersing step includes dissolving or suspending component (B) in an organic solvent, mixing the solution or suspension of component (B) with component (A), and then evaporating the solvent. More preferably, the step of mixing the solution or suspension of component (B) with component (A) is carried out while keeping component (A) molten.

In another preferred embodiment, the dispersing step includes mixing component (B) with a polar polymer having aromatic functional groups to form a master batch, and mixing the master batch with component (A). More preferably, the step of mixing the master batch with component (A) is carried out while keeping component (A) molten.

Further preferably, the step of forming at least one layer of the cover from a cover stock composition includes injection molding the cover stock composition resulting from the uniformly dispersing step.

The golf ball of the invention has a good balance of rebound, durability and feel on impact and can be effectively produced by the inventive method.

DESCRIPTION OF THE PREFERRED EMBODIMENTS

The golf ball of the invention has a core and a cover of one or more layers enclosing the core. At least one layer of the cover is formed of a cover stock composition comprising (A) a thermoplastic resin and (B) fullerene and/or carbon nanotubes uniformly dispersed therein. The "uniformly dispersed" state refers to the state that when component (B) is compounded in component (A), component (B) in the form of particles having a size of up to 0.7 mm, preferably up to 0.45 mm is dispersed in component (A), more preferably the state that component (B) is kept dissolved in component (A). Judgment is made by pressure molding a mixture of components (A) and (B) into a pressed cake having a diameter of about 180 mm and visually examining the cake. The mixture is judged to be "uniformly dispersed" when no particles of component (B) having a size of more than 0.7 mm are visually perceivable on the cake.

From the standpoints of rebound and durability, the thermoplastic resin (A) used herein is preferably selected from among (a) an ionomer resin, (b) a thermoplastic polyurethane, (c) a thermoplastic polyester elastomer, (d) a thermoplastic block copolymer, and a combination thereof.

The ionomer resin (a) is selected from among (a-1) an olefin-unsaturated carboxylic acid random copolymer, (a-2) a metal ion-neutralized product of an olefin-unsaturated carboxylic acid random copolymer, (a-3) an olefin-unsaturated carboxylic acid-unsaturated carboxylic acid ester random copolymer, (a-4) a metal ion-neutralized product of an olefin-unsaturated carboxylic acid-unsaturated carboxylic acid ester random copolymer, and mixtures thereof. It is appreciated that at least either component (a-2) or (a-4) is essentially included in the ionomer resin (a).

As the olefin included in components (a-1) to (a-4), α-olefins are preferred. Preferred α-olefins are those of at least 2 carbon atoms and up to 8, more preferably up to 6 carbon atoms. Examples of the α-olefin include ethylene, propylene, butene, pentene, hexene, heptene and octene. Of these, ethylene is most preferred. A mixture of such olefins is also useful.

As the unsaturated carboxylic acid included in components (a-1) to (a-4), α,β-unsaturated carboxylic acids having 3 to 8 carbon atoms are preferred. Examples include acrylic acid, methacrylic acid, maleic acid and fumaric acid. Of these, acrylic acid and methacrylic acid are preferably used. A mixture of such unsaturated carboxylic acids is also useful.

It is recommended for components (a-1) to (a-4) that the content of unsaturated carboxylic acid (sometimes referred to as acid content) be controlled. The content of unsaturated carboxylic acid in component (a-1) or (a-2) is typically at least 4 wt %, preferably at least 6 wt %, more preferably at least 8 wt %, most preferably at least 10 wt %, and as the upper limit, typically up to 30 wt %, preferably up to 20 wt %, more preferably up to 18 wt %, most preferably up to 15 wt %. Too low an unsaturated carboxylic acid content may provide a lower rigidity and resilience, resulting in a golf ball with lower flight performance. On the other hand, too high an unsaturated carboxylic acid content may lead to insufficient flexibility. The content of unsaturated carboxylic acid in component (a-3) or (a-4) is typically at least 4 wt %, preferably at least 6 wt %, more preferably at least 8 wt %, and as the upper limit, typically up to 15 wt %, preferably up to 12 wt %, more preferably up to 10 wt %. Too low an unsaturated carboxylic acid content may lead to a loss of resilience whereas too high an unsaturated carboxylic acid content may detract from processability.

The unsaturated carboxylic esters included in components (a-3) and (a-4) are preferably lower alkyl esters of the above-mentioned unsaturated carboxylic acids. Examples include those esters prepared by reacting the unsaturated carboxylic acids with lower alcohols such as methanol, ethanol, propanol, n-butanol and isobutanol. Of these, acrylates and methacrylates are preferred. Specific examples include methyl methacrylate, ethyl methacrylate, propyl methacrylate, butyl methacrylate, methyl acrylate, ethyl acrylate, propyl acrylate, butyl acrylate, etc. Inter alia, butyl acrylate (n-butyl acrylate or isobutyl acrylate) is preferred. A mixture of such unsaturated carboxylic esters is also useful.

Components (a-1) and (a-3), which are collectively referred to as "random copolymers," hereinafter, are obtainable by mixing desired amounts of the respective reactants and effecting random copolymerization in a well-known manner.

Components (a-2) and (a-4), which are collectively referred to as "metal ion-neutralized random copolymers," hereinafter, are obtainable by neutralizing acid groups in the random copolymers with metal ions. Examples of metal ions that may be used to neutralize acid groups include $Na^+$, $K^+$, $Li^+$, $Zn^{2+}$, $Cu^{2+}$, $Mg^{2+}$, $Ca^{2+}$, $Co^{2+}$, $Ni^{2+}$, and $Pb^{2+}$. Of these, $Li^+$, $Na^+$, $Mg^{2+}$, $Ca^{2+}$ and $Zn^{2+}$ are especially preferred. For neutralization, there may be used compounds of the foregoing metal ions, such as formates, acetates, nitrates, carbonates, bicarbonates, oxides, hydroxides and alkoxides.

It is recommended from the standpoint of facilitating resin mixing and molding without sacrificing the resilience of the cover that in the metal ion-neutralized random copolymer, the degree of neutralization be at least 10 mol %, preferably at least 20 mol %, more preferably at least 30 mol %, and as the upper limit, up to 80 mol % and preferably up to 70 mol %, based on the carboxylic acid groups in the copolymer.

The thermoplastic polyurethane (b) is preferably composed of a polymeric polyol compound to constitute soft segments, a monomolecular chain extender to constitute hard segments, and a diisocyanate.

The polymeric polyol used herein, though not particularly limited, may be selected from polyester base polyols, polyol base polyols, polyether base polyols, copolyester base polyols, and polycarbonate base polyols. Illustrative, non-limiting examples of the polyester base polyols include polycaprolactone glycol, poly(ethylene-1,4-adipate)glycol and poly(butylenes-1,4-adipate)glycol; an exemplary copolyester base polyol is poly(diethylene glycol adipate)glycol; an exemplary polycarbonate base polyol is poly(hexanediol-1,6-carbonate)glycol; and an exemplary polyether base polyol is polyoxytetramethylene glycol. The polymeric polyol typically has a number average molecular weight of about 600 to 5,000, preferably about 1,000 to 3,000.

Preferred diisocyanates are aliphatic and aromatic diisocyanates which are typical when polyurethane is used as the golf ball cover stock. Specific examples include hexamethylene diisocyanate (HDI), 2,2,4- or 2,4,4-trimethylhexamethylene diisocyanate (TMDI), lysine diisocyanate (LDI), tolylene diisocyanate (TDI), and diphenylmethane diisocyanate (MDI). Of these, aromatic diisocyanates are more preferred for compatibility with component (B), and diphenylmethane diisocyanate (MDI) is most preferred for compatibility with other resins upon blending.

The monomolecular chain extender used herein is not particularly limited and may be selected from commonly used polyhydric alcohols and amines. Specific examples include 1,4-butylene glycol, 1,2-ethylene glycol, 1,3-propylene glycol, 1,6-hexylene glycol, 1,3-butylene glycol, dicyclohexylmethyl methane diamine (hydrogenated MDI) and isophorone diamine (IPDA).

With respect to the hardness of thermoplastic polyurethane (b), it typically has a JIS-A hardness of 70 to 100, preferably 80 to 98, more preferably 90 to 99, even more preferably 95 to 98, as measured according to JIS K-6301. If the JIS-A hardness is less than 70, the spin rate when hit with a driver may be excessively increased, resulting in a reduced carry.

Also, thermoplastic polyurethane (b) typically has a specific gravity of 1.0 to 1.3 ($g/cm^3$), more preferably 1.1 to 1.25 ($g/cm^3$).

Commercial products may be suitably used as the thermoplastic polyurethane (b). Illustrative examples include Pandex T-R8175, T8190, and T8160D manufactured by DIC Bayer Polymer Co., Ltd.

The thermoplastic polyester elastomer (c) is not critical as long as it is a polyester base thermoplastic elastomer. Use is preferably made of a polyester base block copolymer composed primarily of high-melting crystalline polymer segments (hard segments) made of crystalline aromatic polyester units and low-melting polymer segments (soft segments) made of aliphatic polyether units and/or aliphatic polyester units.

Preferred examples of the high-melting crystalline polymer segments made of crystalline aromatic polyester units include polybutylene terephthalate derived from terephthalic acid and/or dimethyl terephthalate in combination with 1,4-butanediol. Other suitable, non-limiting, examples include polyesters derived from a dicarboxylic acid component such as orthophthalic acid, isophthalic acid, terephthalic acid, naphthalene-2,6-dicarboxylic acid, naphthalene-2,7-dicarboxylic acid, diphenyl-4,4'-dicarboxylic acid, diphenoxyethanedicarboxylic acid, 5-sulfoisophthalic acid or an ester-forming derivative thereof in combination with a diol having a molecular weight of up to 300, such as an aliphatic diol (e.g., ethylene glycol, trimethylene glycol, 1,4-butanediol, pentamethylene glycol, hexamethylene glycol, neopentyl glycol, decamethylene glycol), an alicyclic diol (e.g., 1,4-cyclohexanedimethanol, tricyclodecanedimethylol), or an aromatic diol (e.g., xylylene glycol, bis(p-hydroxy)diphenyl, bis(p-hydroxyphenyl)propane, 2,2-bis[4-(2-hydroxyethoxy)phenyl]propane, bis[4-(2-hydroxy)phenyl]sulfone, 1,1-bis[4-(2-hydroxyethoxy)phenyl] cyclohexane, 4,4'-dihydroxy-p-terphenyl and 4,4'-dihydroxy-p-quarterphenyl). Use can also be made of copolymeric polyesters obtained using two or more of these dicarboxylic acid components and diol components. In addition, polycarboxylic acid components, polyoxy components and polyhydroxy components having a functionality of three or more can be copolymerized therein within a range of up to 5 mol %.

In the low-melting polymer segments made of aliphatic polyether units and/or aliphatic polyester units, illustrative examples of the aliphatic polyether include poly(ethylene oxide)glycol, poly(propylene oxide)glycol, poly(tetramethylene oxide)glycol, poly(hexamethylene oxide) glycol, copolymers of ethylene oxide and propylene oxide, ethylene oxide addition polymers of poly(propylene oxide) glycols, and copolymers of ethylene oxide and tetrahydrofuran. Illustrative examples of the aliphatic polyester include poly(ε-caprolactone), polyenantholactone, polycaprylolactone, poly(butylene adipate) and poly(ethylene adipate). As long as the elastic properties of the resultant polyester block copolymer are concerned, poly(tetramethylene oxide)glycol, ethylene oxide addition polymers of poly(propylene oxide)glycols, poly(ε-caprolactone), poly(butylene adipate) and poly(ethylene adipate) are preferred, with poly(tetramethylene oxide)glycol being most preferred.

The low-melting polymer segments preferably have a number average molecular weight in the copolymerized state of about 300 to 6,000. It is noted that the "number average molecular weight" as used herein is computed from GPC measurements using polystyrene standards.

In cases where the thermoplastic polyester elastomer (c) is composed primarily of high-melting crystalline polymer segments made of crystalline aromatic polyester units and low-melting polymer segments made of aliphatic polyether units and/or aliphatic polyester units, it is advantageous to adjust the amounts of high-melting crystalline polymer segments and low-melting polymer segments such that the weight ratio of high-melting crystalline polymer segments to low-melting polymer segments is between 85/15 and 10/90, preferably between 85/15 and 50/50. If the proportion of low-melting polymer segments is too high, the thermoplastic polyester elastomer may have inadequate melt characteristics for injection molding, which can make it difficult to achieve uniform mixture during melt blending. On the other hand, if the proportion is too low, sufficient flexibility and resilience may not be achieved.

The total amount of high-melting crystalline polymer segments and low-melting polymer segments is typically at least 50 wt %, preferably at least 70 wt %, more preferably at least 90 wt % of the thermoplastic polyester elastomer.

It is not critical how to prepare the thermoplastic polyester elastomer (c). Any well-known method may be used. Exemplary are methods (i) to (v) described below, any of which may be advantageously employed to prepare the thermoplastic polyester elastomer.

(i) Method of effecting transesterification of a low alcohol diester of dicarboxylic acid, an excess of a low molecular weight glycol, and a low-melting polymer segment component in the presence of a catalyst, followed by polycondensation of the reaction product.

(ii) Method of effecting esterification of a dicarboxylic acid, an excess of a glycol, and a low-melting polymer segment component in the presence of a catalyst, followed by polycondensation of the reaction product.

(iii) Method of preforming a high-melting crystalline segment, adding a low-melting segment component thereto, and effecting transesterification for randomization.

(iv) Method of linking a high-melting crystalline segment to a low-melting polymer segment using a concatenating agent.

(v) Method of effecting addition of ε-caprolactone monomer to a high-melting crystalline segment when poly(ε-caprolactone) is used as the low-melting polymer segment.

With respect to the hardness of the thermoplastic polyester elastomer (c), it is recommended from the standpoint of golf ball feel improvement, though not critical, that the elastomer have a Shore D hardness of typically at least 10, preferably at least 20, and as the upper limit, up to 50, especially up to 40, as measured according to ASTM D-2240. It is recommended from the standpoint of golf ball feel improvement that the thermoplastic polyester elastomer (c) have a lower hardness (i.e., be more flexible) than the ionomer resin (a).

Though not critical, it is also preferred that the thermoplastic polyester elastomer (c) exhibit a high rebound resilience, typically of at least 40%, preferably at least 50%, and as the upper limit, typically up to 90%, as measured according to the BS Standard 903. If the rebound resilience of the thermoplastic polyester elastomer (c) is too low, rebound may be compromised so that the golf ball sometimes degrades its flight performance.

Though not critical, it is further preferred that the thermoplastic polyester elastomer (c) have a relatively low flexural modulus, typically of at least 5 MPa, preferably at least 10 MPa, more preferably at least 15 MPa, and as the upper limit, up to 250 MPa, preferably up to 200 MPa, more preferably up to 150 MPa, as measured according to JIS K-7106. If the flexural modulus is too high, the golf ball may sometimes degrade its feel on impact and durability.

Suitable examples of the thermoplastic block copolymer (d) include those composed of crystalline polyethylene blocks (C) and/or crystalline polystyrene blocks (S) as hard segments and polybutadiene blocks (B), polyisoprene blocks (I), relatively random copolymer structure blocks (EB) of ethylene and butylene, and/or relatively random copolymer structure blocks (EP) of ethylene and propylene as soft segments. Preferred soft segments are EB and/or EP, with EB being most preferred.

Suitable examples of the thermoplastic block copolymer (d) include, but are not limited to, S-EB-S, S-B-S, S-I-S, S-EB, S-EB-S-EB, S-EP-S, S-EB-C, S-B-C, S-I-C, S-EP-C, C-EB-C, C-B-C, C-I-C, C-EB, C-EB-C-EB, C-EP-C, etc. The inclusion of crystalline polyethylene blocks (C) in the hard segments is preferred for resilience. Of these structures, S-EP-C and C-EB-C are preferred.

When the thermoplastic block copolymer (d) is a thermoplastic block copolymer of C-EB-C or S-EB-C type, it can be obtained, for example, by hydrogenating butadiene or a styrene-butadiene copolymer. The polybutadiene or styrene-butadiene copolymer subject to hydrogenation is preferably a polybutadiene in which the butadiene structure contains 1,4 polymer blocks which are at least 95 wt % composed of 1,4 units, and the overall butadiene structure has a 1,4 unit content of at least 50 wt %, and more preferably at least 80 wt %. The degree of hydrogenation in the hydrogenation product, expressed as the percent of double bonds in the polybutadiene or styrene-butadiene copolymer that are converted to saturated bonds, is preferably 60 to 100%, and more preferably 90 to 100%. Too low a degree of hydrogenation may lead to deterioration such as gelation in the blending step with the ionomer resin or the like, and cause problems of weatherability and impact durability to the cover in the completed golf ball.

In the thermoplastic block copolymer (d), the hard segment content is preferably 10 to 50% by weight. A hard segment content which is too high may result in so low a flexibility as to keep the objects of the invention from being effectively achieved, whereas a hard segment content which is too low may give rise to problems in molding of the blend.

Preferably the thermoplastic block copolymer (d) has a number average molecular weight of about 30,000 to 800,000. The thermoplastic block copolymer (d) has a melt index at 230° C. of preferably 0.5 to 15 g/10 min, and more preferably 1 to 7 g/10 min, as measured under a test load of 21.2 N (2.16 kgf) according to JIS K-6760. Outside the range, problems such as weld lines, sink marks and short shots may arise during injection molding.

It is also preferred from the standpoint of providing a mixture with an appropriate melt viscosity that the thermoplastic block copolymer (d) be free of a functional group capable of reacting with the ionomer resin.

Component (B) used herein is fullerene or carbon nanotubes or both. Examples of fullerene include fullerenes $C_{60}$, $C_{70}$, $C_{74}$, $C_{76}$, $C_{78}$, $C_{80}$ and $C_{84}$, and fullerene derivatives such as halogenated fullerenes $C_{60}F_{48}$, $C_{60}Cl_{24}$ and $C_{60}Br_{24}$, hydroxylated fullerene $C_{60}(OH)_{24}$, and hydrogenated fullerene $C_{60}H_{24}$, which may be used alone or in admixture of two or more. Commercial products may be used as the fullerene. Commercial examples include $C_{60}$, Mixed Fullerene, Hydroxylated Fullerene, Hydrogenated Fullerene, Porous Fullerene and Frontier Black by Frontier Carbon Corporation; Fullerene $C_{60}$ and $C_{70}$ by Tokyo Kasei Kogyo Co., Ltd.; Fullerene $C_{84}$ by Strem Chemicals, Inc.; hydroxylated fullerene powder $C_{60}(OH)_n$ wherein n=20 to 28 by Johnson Matthey Company.

Commercial products of carbon nanotubes are also useful. For example, monolayer carbon nanotubes and multilayer carbon nanotubes are available from Aldrich.

According to the invention, a golf ball comprising a core and a cover of one or more layers enclosing the core is prepared by a method comprising the step of forming at least one layer of the cover from a cover stock composition comprising (A) a thermoplastic resin and (B) fullerene and/or carbon nanotubes. The forming step includes the step of uniformly dispersing component (B) in component (A). It is preferred for improved dispersion that the dispersing step include dissolving or suspending component (B) in an organic solvent, mixing the solution or suspension of component (B) with component (A), and thereafter evaporating the solvent.

Herein, component (B) dissolved or suspended in an organic solvent means that component (B) is dissolved in an organic solvent to form a homogeneous solution or fine particles of component (B) are dispersed in an organic solvent to form a suspension. Judgment is made by admixing component (B) in an organic solvent, holding the mixture for 30 minutes and then visually observing whether or not particles have settled down. Component (B) is judged as being dissolved or suspended in an organic solvent when no particles have settled down.

In the dispersing step including mixing the solution or suspension of component (B) in an organic solvent with component (A), the organic solvent used is selected from, for example, naphthalene solvents such as methylnaphthalene, dimethylnaphthalene, phenylnaphthalene, chloronaphthalene and bromomethylnaphthalene; benzene solvents such as benzene, toluene, ethylbenzene, propylbenzene, butylbenzene, xylene, trimethylbenzene, tetramethylbenzene, tetralin, dibromobenzene, anisole, chlorobenzene, dichlorobenzene, and trichlorobenzene; alkane solvents such as dacalin; haloalkane solvents such as tetrachloroethane; and polar solvents such as carbon disulfide, methylthiphene and methylpyrrolidone. Of these, aromatic organic solvents are preferred, with toluene and xylene being most preferred.

The concentration of component (B) in the organic solvent is typically at least 0.1 mg/ml, preferably at least 1 mg/ml, more preferably at least 2 mg/ml, and as the upper limit, up to 100 mg/ml, preferably up to 80 mg/ml, more preferably up to 50 mg/ml. If the concentration of component (B) in the organic solvent is less than 0.1 mg/ml, operation may become inefficient. A concentration of more than 100 mg/ml may adversely affect dispersion.

Preferably, for improved dispersion, the step of mixing the solution or suspension of component (B) with component (A) is carried out while keeping component (A) molten. The step of mixing under the molten state of component (A) advantageously uses a mixer such as a twin-screw extruder, single-screw extruder, kneader or Banbury mixer, with the twin-screw extruder being most preferred. Using such a mixer, the solution or suspension of component (B) can be mixed with component (A) in the molten state.

When components (B) and (A) are mixed on a mixer such as a kneader or Banbury mixer, the set temperature of the mixer is typically up to 150° C., preferably up to 120° C. Similarly, when components (B) and (A) are mixed on an extruder such as a twin- or single-screw extruder, the set temperature of a section of the extruder where the solution or suspension of component (B) is added to component (A) in the molten state is typically up to 150° C., preferably up to 120° C. Although the step of mixing at higher temperature the solution or suspension of component (B) in an organic solvent with component (A) in the molten state involves no danger per se, setting the temperature of the mixer or extruder in the above range permits both the components to be mixed in a relatively safe manner.

The (net) amount of component (B) compounded per 100 parts by weight of component (A) is usually at least 0.01 part by weight, preferably at least 0.05 part by weight, and as the upper limit, up to 5 parts by weight, preferably up to 1 part by weight. If the net amount of component (B) compounded per 100 parts by weight of component (A) is less than 0.01 part by weight, physical properties may be little improved. More than 5 parts by weight of component (B) compounded may adversely affect dispersion and rather detract from durability.

Once the solution or suspension of component (B) in an organic solvent is mixed with component (A), the solvent is volatilized off. Volatilization may be done by heating under atmospheric pressure. Alternatively, a mixer or twin-screw extruder provided with a vent is used for venting under vacuum.

In another preferred embodiment recommended from the standpoint of compatibility with component (B), the uniformly dispersing step includes mixing component (B) with a polar polymer having aromatic functional groups to form a master batch, and mixing the master batch with component (A). Examples of the polar polymer having aromatic functional groups include styrenic polymers or elastomers thereof such as polystyrene and styrenic elastomers; aromatic polyesters or elastomers thereof such as aromatic polyester elastomers; aromatic polyurethane or elastomers thereof such as aromatic polyurethane elastomers; and aromatic polyamide elastomers such as polyether ester amides. Of these, styrenic elastomers, aromatic polyester elastomers and aromatic polyurethane elastomers are advantageously used. The styrenic elastomers are more preferred, and styrenic elastomers terminally modified with modifier groups such as amino groups are most preferred for compatibility with component (A). Component (B) is typically mixed with the polar polymer in a weight ratio between 1/99 and 99/1, preferably between 5/95 and 15/85.

Once component (B) is mixed with the polar polymer having aromatic functional groups to form a master batch, the master batch is mixed with component (A). For improved dispersion, the step of mixing the master batch with component (A) is preferably carried out while keeping component (A) molten.

As in the foregoing embodiment, the step of mixing under the molten state of component (A) advantageously uses a mixer such as a twin-screw extruder, single-screw extruder, kneader or Banbury mixer, with the twin- or single-screw extruder being most preferred. When the twin- or single-screw extruder is used, the extruder is preferably provided with a mesh screen for removing those particles of component (B) having a larger particle size and by-products and impurities generated during preparation of component (B). The mesh screen used preferably has an opening size of at least 90 mesh, preferably at least 120 mesh.

The (net) amount of component (B) compounded per 100 parts by weight of component (A) is usually at least 0.01 part by weight, preferably at least 0.05 part by weight, and as the upper limit, up to 5 parts by weight, preferably up to 1 part by weight. If the net amount of component (B) compounded per 100 parts by weight of component (A) is less than 0.01 part by weight, physical properties may be little improved. More than 5 parts by weight of component (B) compounded may adversely affect dispersion and rather detract from durability.

In the cover stock composition of the invention, various additives such as pigments, dispersants, antioxidants, UV absorbers, photo-stabilizers and inorganic fillers may be added as long as the objects of the invention are not impaired. The amount of such an additive compounded is not critical although the amount is typically 0.1 to 50 parts, preferably 0.5 to 30 parts, more preferably 1 to 6 parts by weight per 100 parts by weight of components (A) and (B) combined. Too much amounts of additives may fail to achieve a uniformly dispersed state of component (B), losing durability. Less amounts of additives may fail to achieve their addition effect.

In the method of preparing a golf ball according to the invention, no particular limits are imposed as long as the step of forming at least one layer of the cover from a cover stock composition comprising (A) a thermoplastic resin and (B) fullerene and/or carbon nanotubes includes the step of uniformly dispersing component (B) in component (A). In one exemplary procedure, the cover stock composition resulting from the uniformly dispersing step is previously molded into a pair of hemispherical half-cups, and a core which may be enclosed with an intermediate layer is encased within the half-cups, followed by compression molding. Alternatively, a simple dry blend of components (A) and (B) is injection molded. In this case, the injection molding step also serves as the uniformly dispersing step. For further improved dispersion, however, it is preferred to injection mold the cover stock composition resulting from the uniformly dispersing step, rather than the dry blend.

In one suitable procedure of carrying out such injection molding, component (A) is premixed with the solution or suspension of component (B) in an organic solvent or a mixture (or master batch) of component (B) and a polar polymer and the premix is fed to the injection molding machine. In an alternative procedure, the two components are fed to the injection molding machine through separate feed ports or the same feed port, without premixing them. Advantageously implementation of injection molding in this way achieves a reduction of manufacturing cost and a good dispersion of component (B) in component (A) at the same time.

In order to ensure a fluidity suited for injection molding and improve moldability, the cover stock composition according to the invention should preferably have a controlled melt index. It is recommended that the melt index (MI), as measured at a test temperature of 190° C. and a test load of 21.2 N (2.16 kgf) according to JIS K-6760, be typically adjusted to at least 0.5 dg/min, preferably at least 1 dg/min, more preferably at least 1.5 dg/min, most preferably at least 2 dg/min, and as the upper limit, up to 20 dg/min., preferably up to 10 dg/min, more preferably up to 5 dg/min, most preferably up to 3 dg/min. With too high or too low a melt index, processability may be substantially lost.

The core in the inventive golf ball may be either a thread-wound core or a solid core and may be produced by a conventional method. For example, the solid core can be produced from a rubber composition comprising 100 parts by weight of cis-1,4-polybutadiene; from 10 to 60 parts by weight of one or more crosslinking or vulcanizing agents selected from among $\alpha,\beta$-monoethylenically unsaturated carboxylic acids (e.g., acrylic acid, methacrylic acid) or metal ion-neutralized compounds thereof and functional monomers (e.g., trimethylolpropane methacrylate); from 5 to 30 parts by weight of a filler such as zinc oxide or barium sulfate; from 0.5 to 5 parts by weight of a peroxide such as dicumyl peroxide; and, if necessary, from 0.1 to 1 part by weight of an antioxidant. The rubber composition may be formed into a solid spherical core by press vulcanization to effect crosslinkage, followed by compression under heating at 140 to 170° C. for a period of 10 to 40 minutes.

The core may have a structure of a single layer or plural layers. With respect to core surface hardness, the core typically has a JIS-C hardness of 60 to 85, preferably 65 to 83, more preferably 67 to 80, as measured according to JIS K-6301. Too high a core hardness may lead to too hard a feel on impact and too much a spin rate when hit with a driver (W#1). Too low a core hardness may lead to too soft a feel on impact, too low a resilience to provide a carry, and poor crack durability upon repeated impact.

It is recommended that the core have an amount of deflection or deformation, when subjected to a load of 980 N (100 kg), of at least 2.0 mm, preferably at least 2.5 mm, more preferably at least 2.8 mm, and most preferably at least 3.2 mm, but not more than 6.0 mm, preferably not more than 5.5 mm, more preferably not more than 5.0 mm, and most preferably not more than 4.5 mm. Too small a deformation may worsen the feel of the ball upon impact and, particularly on long shots such as with a driver in which the ball incurs a large deformation, may subject the ball to an excessive rise in spin, reducing the carry. On the other hand, if the core is too soft, the golf ball tends to have a dead feel when hit, an inadequate rebound that results in a poor carry, and a poor durability to cracking with repeated impact.

The core typically has a diameter of at least 25 mm, preferably at least 36 mm, and as the upper limit, up to 40 mm, preferably up to 39 mm, more preferably up to 38 mm.

The golf ball of the invention is arrived at by enclosing the core with a cover including at least one layer formed of the inventive cover stock composition. The layer formed of the inventive cover stock composition may be part or the entirety of the cover. The golf balls of the invention may take any desired form including thread wound golf balls (in which the cover may be either a single layer or a multilayer structure of two or more layers), two-piece solid golf balls, three-piece solid golf balls, and multi-piece solid golf balls.

The cover layer formed of the inventive cover stock composition typically has a gage of at least 0.5 mm, preferably at least 0.9 mm, more preferably at least 1.1 mm, and as the upper limit, up to 3 mm, preferably up to 2.5 mm, more preferably up to 2.0 mm. Too large a cover gage may lead to a loss of rebound whereas too small a cover gage may lead to a loss of durability.

The golf ball of the invention has numerous dimples formed on the surface of the cover outermost layer. The cover may be administered various treatment such as surface preparation, stamping and painting.

The golf ball of the invention may be manufactured for use in tournaments by giving it a diameter and weight which conform with the Rules of Golf (USGA). That is, the ball may be produced to a diameter of not less than 42.67 mm and preferably not more than 43.00 mm and a weight of not greater than 45.93 g and preferably not less than 44.6 g. The golf ball is also manufactured to an initial velocity of typically at least 76.4 m/s, preferably at least 76.6 m/s, more preferably at least 76.8 m/s, with the upper limit being up to 77.7 m/s. Too low an initial velocity may result in a short carry whereas too high an initial velocity causes the golf ball to fall outside the specifications set by the Rules of Golf.

Although some preferred embodiments have been described, many modifications and variations may be made thereto in light of the above teachings. It is therefore to be understood that the invention may be practiced otherwise than as specifically described without departing from the scope of the appended claims.

EXAMPLE

Examples of the invention are given below by way of illustration and not by way of limitation.

Core Preparation

Solid cores, designated Nos. 1 and 2, were prepared by molding core compositions under vulcanization conditions as shown in Table 1. For these solid cores, an amount (mm) of deflection under an applied load of 100 kg was measured as a hardness. A specific gravity, weight (g) and outer diameter (mm) were measured; and an initial velocity (m/s) was measured according to the procedure of USGA (R & A).

TABLE 1

| Core | | No. 1 | No. 2 |
| --- | --- | --- | --- |
| Composition (pbw) | Polybutadiene BR01 | 100 | 100 |
| | Zinc acrylate | 21.5 | 21.5 |
| | Dicumyl peroxide | 1 | 1 |
| | Zinc oxide | 26.3 | 12 |
| Vulcanization conditions | Temp. (° C.) | 155 | 155 |
| | Time (min) | 20 | 20 |
| Core | Specific gravity | 1.16 | 1.07 |
| | Weight (g) | 34.8 | 32.1 |
| | Outer diameter (mm) | 38.5 | 38.5 |
| | Hardness (mm) | 3.4 | 3.4 |
| | Initial velocity (m/s) | 77.3 | 78.1 |

BR01: polybutadiene rubber by JSR Corp.

EXAMPLES 1-3 AND 5

A fullerene master batch was prepared by combining Dynaron 4630P and fullerene in a weight ratio of 9:1 and agitating them on a laboratory plasto-mill at 120° C. for 5 minutes. Cover components including mainly ionomer resins or thermoplastic polyurethane elastomer were weighed in accordance with the recipe shown in Table 2 or 3, combined with the master batch, and worked on a twin-screw extruder (diameter 30 mm, L/D=32) having a temperature profile with a maximum temperature of 200° C. and at a rate of 10 kg/h, obtaining a cover material. The cover material was injection molded over the core No. 1 or 2 held in a mold, producing a two-piece golf ball.

EXAMPLE 4

Fullerene was dissolved in toluene in a concentration of 10 mg/ml. Cover components including mainly ionomer resins were weighed in accordance with the recipe shown in Table 2 and worked on a twin-screw extruder (diameter 30 mm, L/D=32) having a temperature profile with a maximum temperature of 200° C. and at a rate of 10 kg/h, obtaining a cover material.

During the process, the fullerene solution was added to the extruder separately from the other components. The position of the extruder where the solution was added was set at a temperature of 80° C. The solvent was volatilized and vented in vacuum. Thereafter, the cover material was injection molded over the core No. 1 held in a mold, producing a two-piece golf ball.

COMPARATIVE EXAMPLES 1-6

Cover components were weighed in accordance with the recipe shown in Table 2 or 3 and worked on a twin-screw extruder (diameter 30 mm, L/D=32) having a temperature profile with a maximum temperature of 200° C. and at a rate of 10 kg/h, obtaining a cover material. The cover material was injection molded over the core No. 1 or 2 held in a mold, producing a two-piece golf ball.

The golf balls thus obtained were tested as follows. The results are also shown in Tables 2 and 3.

Uniformity

A mixture obtained by mixing a cover material was molded under pressure into a pressed cake having a diameter of 180 mm. On visual observation of the cake, the mixture was judged to be not uniformly dispersed (X) when particles of fullerene having a size of more than 0.7 mm were perceivable, and "uniformly dispersed" (○) when no fullerene particles of such size were perceivable.

Outer Diameter and Weight

The outer diameter (mm) and weight (g) of the finished ball were measured.

Hardness

For the finished ball, an amount (mm) of deflection under an applied load of 100 kg was measured as a hardness. Larger values indicate softer balls.

Surface Hardness

The hardness of the ball on the surface was measured by the test method of ASTM D2240 or JIS K-7311.

Initial Velocity

An initial velocity was measured according to the procedure of USGA (R & A).

Durability

The ball was repeatedly hit against a steel plate at an incident speed of 43 m/s. The number of hits repeated until the ball failed was counted. The ball was rated to be durable (○) when the count is 100 hits or more and less durable (X) when the count is less than 100 hits.

TABLE 2

|  | | Example | | | | Comparative Example | | | |
| --- | --- | --- | --- | --- | --- | --- | --- | --- | --- |
| | Core | 1<br>No. 1 | 2<br>No. 1 | 3<br>No. 1 | 4<br>No. 1 | 1<br>No. 1 | 2<br>No. 1 | 3<br>No. 1 | 4<br>No. 1 |
| Cover | Himilan 1605 | 50 | 50 | 50 | 50 | 50 | 50 | 50 | 50 |
| | Himilan 1706 | 50 | 50 | 50 | 50 | 50 | 50 | 50 | 50 |
| | Dynaron 4630P | | | | | | 0.45 | 0.9 | 4.5 |
| | Fullerene | | | | 0.1 | | 0.05 | 0.1 | 0.5 |
| | Fullerene master batch | 0.5 | 1 | 5 | | | | | |
| | Titanium dioxide | 2 | 2 | 2 | 2 | 2 | 2 | 2 | 2 |
| | Uniformity | ○ | ○ | ○ | ○ | — | X | X | X |
| | Surface hardness (Shore D) | 63 | 63 | 63 | 63 | 63 | 63 | 62 | 62 |
| Ball | Outer diameter (mm) | 42.7 | 42.7 | 42.7 | 42.7 | 42.7 | 42.7 | 42.7 | 42.7 |
| | Weight (g) | 45.2 | 45.2 | 45.2 | 45.2 | 45.2 | 45.2 | 45.2 | 45.2 |
| | Hardness (mm) | 2.6 | 2.6 | 2.6 | 2.6 | 2.6 | 2.6 | 2.7 | 2.7 |
| | Initial velocity (m/s) | 77.4 | 77.4 | 77.4 | 77.4 | 77.3 | 77.3 | 77.2 | 77.2 |
| | Durability | ○ | ○ | ○ | ○ | ○ | X | X | X |

TABLE 3

| | | Example | Comparative Example | |
| --- | --- | --- | --- | --- |
| | Core | 5<br>No. 2 | 5<br>No. 2 | 6<br>No. 2 |
| Cover | TPU | 100 | 100 | 100 |
| | Dynaron 4630P | | | 0.9 |
| | Fullerene | | | 0.1 |
| | Fullerene master batch | 1 | | |
| | Titanium dioxide | 2 | 2 | 2 |
| | Uniformity | ○ | — | X |
| | Surface hardness (JIS-A) | 98 | 98 | 97 |
| Ball | Outer diameter (mm) | 42.7 | 42.7 | 42.7 |
| | Weight (g) | 45.2 | 45.2 | 45.2 |
| | Hardness (mm) | 2.8 | 2.8 | 2.9 |
| | Initial velocity (m/s) | 77.1 | 77.0 | 76.9 |
| | Durability | ○ | ○ | X |

Fullerene: a mixture of 60% of $C_{60}$, 25% of $C_{70}$ and higher fullerenes
Dynaron 4630P: styrenic thermoplastic elastomer (JSR Corp.)
Himilan 1605: sodium ion-neutralized ethylene-methacrylic acid copolymer (Dupont-Mitsui Polychemicals Co., Ltd.)
Himilan 1706: zinc ion-neutralized ethylene-methacrylic acid copolymer (Dupont-Mitsui Polychemicals Co., Ltd.)
TPU: thermoplastic polyurethane elastomer of MDI-PTMG Japanese Patent Application No. 2003-324433 is incorporated herein by reference.

Although some preferred embodiments have been described, many modifications and variations may be made thereto in light of the above teachings. It is therefore to be understood that the invention may be practiced otherwise than as specifically described without departing from the scope of the appended claims.

The invention claimed is:

1. A method of preparing a golf ball comprising a core and a cover of one or more layers enclosing the core, said method comprising the step of forming at least one layer of the cover from a cover stock composition comprising (A) a thermoplastic resin and (B) fullerene and/or carbon nanotubes, the forming step including the step of uniformly dispersing component (B) in component (A), wherein the dispersing step includes dissolving or suspending component (B) in an organic solvent, mixing the solution or suspension of component (B) with component (A), and then evaporating the solvent.

2. A method of preparing a golf ball comprising a core and a cover of one or more layers enclosing the core, said method comprising the step of forming at least one layer of the cover from a cover stock composition comprising (A) a thermoplastic resin and (B) fullerene and/or carbon nanotubes, the forming step including the step of uniformly dispersing component (B) in component (A), wherein the dispersing step includes dissolving or suspending component (B) in an organic solvent, mixing the solution or suspension of component (B) with component (A), and then evaporating the solvent, and wherein the step of mixing the solution or suspension of component (B) with component (A) is carried out while keeping component (A) molten.

3. A method of preparing a golf ball comprising a core and a cover of one or more layers enclosing the core, said method comprising the step of forming at least one layer of the cover from a cover stock composition comprising (A) a thermoplastic resin and (B) fullerene and/or carbon nanotubes, the forming step including the step of uniformly dispersing component (B) in component (A), wherein the dispersing step includes mixing component (B) with a polar polymer having aromatic functional groups to form a master batch, and mixing the master batch with component (A).

4. The method of claim 3, wherein the step of mixing the master batch with component (A) is carried out while keeping component (A) molten.

5. The method of claim 1, wherein the step of forming at least one layer of the cover from a cover stock composition includes injection molding the cover stock composition resulting from the uniformly dispersing step.

* * * * *